July 12, 1966 R. CAMPION 3,260,294
CONVERTIBLE TIRE
Filed Jan. 19, 1965 2 Sheets-Sheet 1
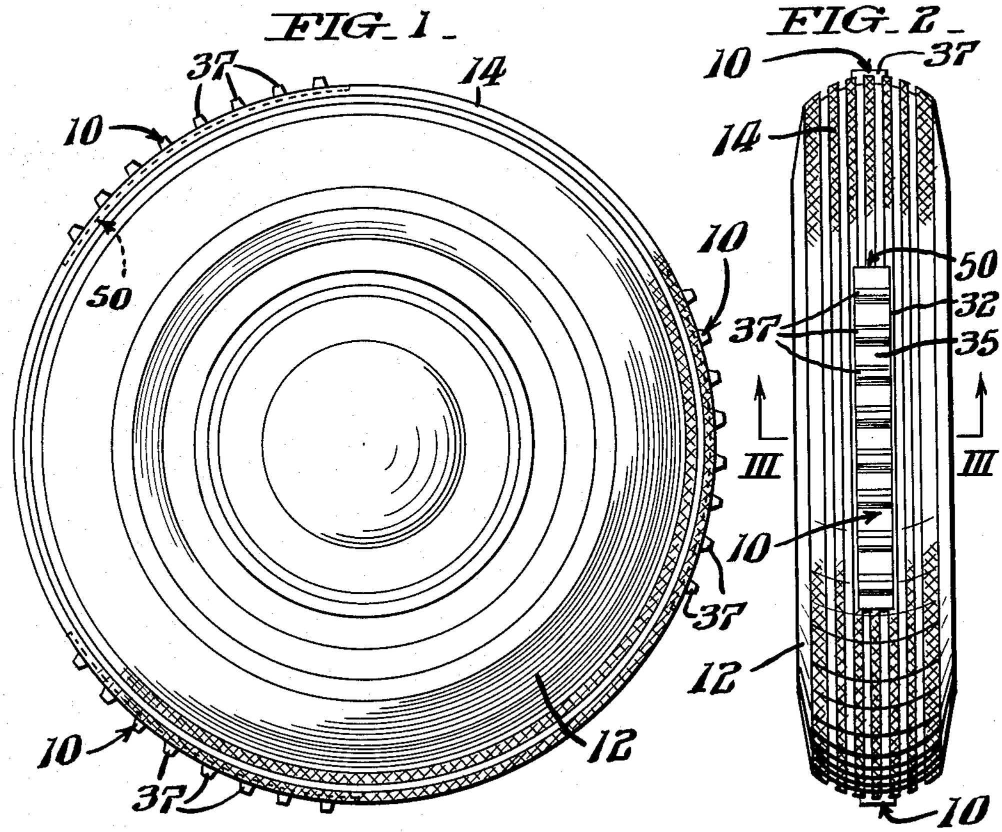
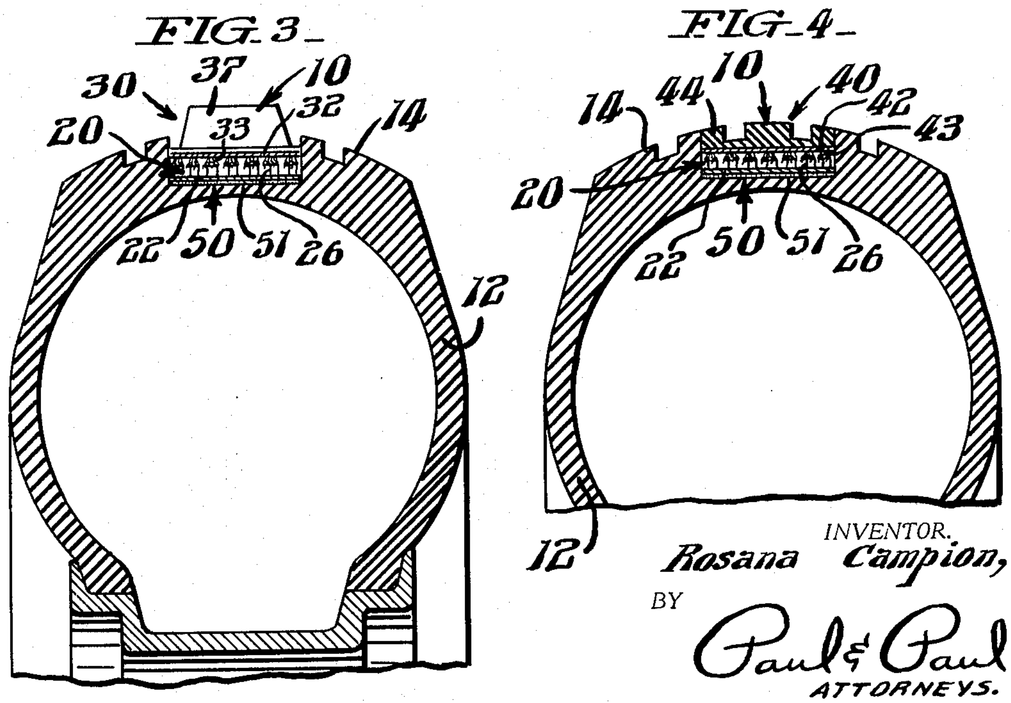
INVENTOR.
Rosana Campion,
BY
Paul & Paul
ATTORNEYS.

CONVERTIBLE TIRE

Filed Jan. 19, 1965

INVENTOR.
Rosana Campion,
BY Paul & Paul
ATTORNEYS.

United States Patent Office 3,260,294

Patented July 12, 1966

1

3,260,294
CONVERTIBLE TIRE

Rosana Campion, 204 Evans Ave., Willow Grove, Pa.

Filed Jan. 19, 1965, Ser. No. 426,547

7 Claims. (Cl. 152—176)

This invention relates to a convertible tire and, in particular, to apparatus for converting a substantially regular tire to one adapted for snow or the like conditions where greater road gripping friction is desired.

It is the primary object of this invention to provide apparatus which may be easily mounted and removed from a specially prepared automobile tire according to the road conditions encountered without requiring replacement or removal of the tire or jacking up the car.

It is a further object of this invention that the tire and apparatus having the above described advantages be readily adaptable or convertible for use and travel on a standard paved surface under normal conditions.

It is a further object of this invention to provide apparatus having the above advantages which is inexpensive to manufacture and which requires little modification of the standard vehicle tire. These objects and other attendant advantages of this invention will become more apparent from the detailed description set forth hereinbelow and the drawings attached hereto, wherein:

FIG. 1 is a side elevational view of an ordinary automobile tire having the preferred form of the apparatus of this invention mounted on the periphery of the tire at three places;

FIG. 2 is an end elevational view of the tire and apparatus shown in FIG. 1;

FIG. 3 is a sectional view of the tire taken along the lines and arrows III—III of FIG. 2;

FIG. 4 is a sectional view similar to that of FIG. 3 wherein an ordinary tire tread section has been mounted on the tread in place of the cleat tread shown in FIG. 3.

FIG. 5 is an enlarged exploded perspective view showing part of a tire and the components forming the apparatus of this invention;

Figures 6, 7, 8:
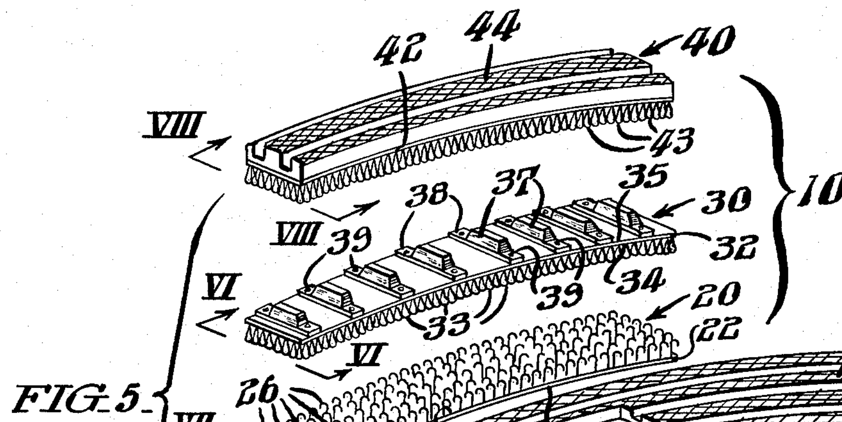
FIG. 6 is a sectional view of the cleat tape component taken along the lines and arrows VI—VI of FIG. 5.
FIG. 7 is a sectional view of the supporting tape component taken along the lines and arrows VII—VII of FIG. 5.
FIG. 8 is a sectional view of the tread tape component taken along the lines and arrows VIII—VIII of FIG. 5.

The following description is directed to the preferred form of the invention illustrated in the drawings and is not intended to limit the scope of the invention itself which may be practiced in a variety of forms and arrangements.

The apparatus 10 of this invention for converting a specifically prepared tire, such as a pneumatic automobile tire, to one particularly adapted for snow, ice and the like conditions is shown in FIG. 1 mounted on an ordinary automobile tire 12 at three locations around the periphery of the tire. As also indicated in FIG. 2, the apparatus 10 is preferably mounted within the crown of the tire tread 14 at equally spaced intervals around the tread. The apparatus 10 may have various widths and lengths according to the size of the tire but a highly acceptable form for an automobile tire is one inch in width and 12 inches in length. It should be recognized that the apparatus of this invention can find advantageous use when mounted on the steering wheels as well as driving wheels of an automobile and is equally adaptable, with certain minor modifications, to the tires or wheels of a truck, tractor, or other vehicles.

The components of the apparatus of this invention, as shown in greatest detail in FIG. 5, comprise a base or supporting strip or tape 20, a cleat strip or tape 30 and

2 a tread strip or tape 40, together with a complementary shaped recess 50 formed in the tire tread. The cleat tape 30 and the tread tape 40 are interchangeable and are mounted on the supporting strip 20 within recess 50 according to the driving conditions.

Supporting tape 20 consists of a generally rectangular base fabric or strip 22, knit or woven of a strong thread such as nylon and having a flat bottom face 23 and a multiplicity of upstanding hook-like threads 26 formed and attached to its upward or outwardly-directed face 24. Each of the hooks 26 is formed of a specially cut thread of an artificial material capable of preserving the hook shape after treatment and use as shown in FIG. 7.

A recess 50 is formed or cut or molded within the normal tread of the tire 12 of a size similar to that of tape 20 which is permanently mounted within the recess at a depth to hold the tape below the surface of the tire tread as indicated in FIG. 4. The supporting tape 20 is fixedly mounted within the recess usually about ¼ inch deep, by use of a suitable adhesive between the bottom 51 of the recess and the bottom surface 23 of the supporting strip or the strip can be fused with the tire when the tire is molded.

The cleat tape 30 consists of a rectangular strip 32 similar in size and construction to the tape 20 but, in contrast, has a multiplicity of loop-like threads 33 formed on the downwardly-directed surface 34. The loop threads 33 and hook threads 26 form the separable gripping or attaching means between the taps 20 and 30. Mounted on the upwardly or outwardly directed face 35 of the cleat strip 32 are a plurality of hard material cleats 37 having flat bases extending across the strip and attached to the strip by rivets 39 which pass through the strip as shown in FIG. 6. The cleats may be formed from metal such as iron or they can be composed of a durable plastic or neoprene, whichever is more suitable to the conditions of use. The cleat tape 30 is mounted on the supporting tape 20 when additional traction is sought.

When additional friction is not required, as when the vehicle is used under normal road conditions, a tread tape 40 is substituted for the cleat tape 30. Tread tape 40 comprises a strong base material 42 similar to strips 22 and 32, having a portion or section of a tread 44 material similar to the remaining portions of the tire tread, mounted on the outwardly-facing surface of the strip 42. Again, a multiplicity of loop-like threads 43 are formed and located on the downwardly-directed face of the strip to engage the hooks 26 of the supporting tape 20. It will be understood that when the layers of hook-like threads and loop-like threads are pressed into face-to-face relation, a substantial percentage of the hooks engage within the loops and the two layers are hooked one to another. Separation of the tapes requires a force of a considerable magnitude when it is attempted to release a large number of hooks at once. Separation may be quite readily effected by progressively peeling the layers apart.

The material-engaging means described herein is known in the trade and fully disclosed in U.S. Patents Nos. 2,717,437 and 3,009,235 whose disclosure is incorporated herein. The separable fastening means is sold in the trade under the trademark "Velcro."

Referring now to FIGS. 3 and 4 of the drawings, the supporting strip 20 is initially fixedly attached to the tire within the tread portion 14 and within the recess 50 as shown by a suitable adhesive or by other means, such as by fusing when the tire is molded. When the car is to be driven under normal road conditions, the tread tape 40 is inserted within the recess on the tape 20 so that the material-locking hooks 26 and loops 43 join within the recess and the tread surface 44 of the tape forms a continuous and smooth surface with the remaining portions of the tread 14 (FIG. 4). When the driving conditions become adverse and additional tire-road friction is desirable, the tread tape is separated from the supporting tape by separating one end of tape 40 and progressively peeling the tread tape from the supporting strip. This may be accomplished while the tire is on the car by moving the car forward or backward slightly so that each portion of the tread tape becomes accessible. When one complete tread tape is removed, the cleat tape 30 may be substituted simply by inserting one end in the recess and progressively pressing the tape against the supporting strip 20. This is quite easily done and the two strips become firmly attached together. The vehicle then may be moved so that the tire rotates, making accessible a second and third tape. In this way, the tire may be converted from one suitable for normal driving conditions to one suitable for snow, ice and similar conditions where additional traction is desired.

It should be understood that the particular cleats 37 shown in the drawings may be modified or otherwise shaped to be suitable for a specific use. The cleats can extend radially further from the tread surface and can be formed separable or fixedly attached to a base plate 38. Chain links can also be attached to the tape 30 to provide the additional friction in place of the cleats. In vehicles employed largely in soft earth, cleats having a curved profile could be used to greater advantage.

It is a modification of this invention that in place of a plurality of recesses and tapes mounted therein located at spaced intervals around the tire, a single tape can be adapted to completely encircle the tire within a similarly shaped recess. In this form of the apparatus of my invention, a series of cleats would be located on the outwardly-directed surface of a single tape and the material-engaging means would be located on over-lapping ends and opposing surfaces of the same tape. This tape would easily be mounted on the tire by simply positioning one end of the tape within the recess in the tire at one point and moving the vehicle so that the tape continued to feed or track in the tire until the end portion overlapped the first inserted portion. Upon pressing the overlapping ends together, the tape would be held tightly against the tire within the recess. In this form of the apparatus, there would be no need for a separate supporting tape.

Although this invention has been disclosed with reference to specific forms and embodiments thereof, it will be appreciated that a great number of variations may be made without departing from the spirit or scope of this invention. For example, parts may be reversed, equivalent elements may be substituted for those specifically disclosed, and certain features of the invention may be used independently of other features, all without departing from the spirit and scope of this invention as defined in the appended claims.

I claim:

1. A convertible tire comprising
a recess formed in the periphery of the tire tread,
a support tape fixedly attached to the tire within the recess,
a manually removable cleat tape mounted within the recess and separably attached to the support tape, said cleat tape having a plurality of cleats fixedly mounted on its outwardly-directed surface, said cleats extending radially outward beyond the normal surface of the tire tread, and
separable means for attaching the two tapes within the tire recess comprising a multiplicity of shaped threads extending from the surface of one tape and a multiplicity of complementary shaped hooks extending from one surface of the other tape, said shaped threads being so complementary shaped that upon pressing the tape surfaces into contact with each other the threads engage the opposing threads in a manually removable relationship and are separable from each other by progressively peeling the tapes apart.

2. The convertible tire as defined in claim 1 wherein the cleat comprises a metallic stud fixedly attached to a flat metallic cleat plate, said cleat plate being attached to and along the outwardly-directed surface of the cleat tape at spaced intervals.

3. The apparatus as defined in claim 1 further including an additional similarly positioned recess with associated support tape and cleat tape.

4. Apparatus for converting a regular tire to one adapted for snow or the like conditions comprising
a recess formed in the periphery of the tire tread having a depth of not more than one-half inch and extending completely around the tread,
a cleat tape having a width similar to that of the recess and a length slightly longer than the circumference of the recess so that the tape overlaps a portion of its length when placed within the recess, said tape having a multiplicity of thread loops extending from one surface of the tape adjacent one end and a multiplicity of thread hooks extending from the other surface at the opposing end, said tape also having a plurality of cleats mounted on the outwardly-directed surface and extending outwardly beyond the normal surface of the tire tread so that upon placing the tape within the recess and overlapping the ends of the tape, the thread hooks and loops engage, preventing separation of the tapes except by progressively peeling the tapes apart.

5. Apparatus for converting a regular tire to one adapted for snow or the like conditions where additional tire friction is desired, said apparatus comprising
a plurality of recesses formed in the periphery of the tire tread equally spaced from each other around the tread, each of said recesses being narrower than the width of the tire tread and having a length considerably greater than its width,
a supporting tape permanently attached to the tire within each recess,
a cleat tape adapted for separable mounting on the supporting tape within each recess material on the inwardly-directed surface, each of said cleat tapes having a series of cleats fixedly mounted at spaced intervals along its exterior surface, said cleats extending beyond the normal surface of the tire tread when the cleat tape is mounted within the recess to provide increased friction in snow or the like conditions, and one of said tapes having thread loop material for engaging thread hook material mounted on the other of said tapes.

6. The apparatus as defined in claim 5 further including
a tread tape for mounting on the supporting tape in place of the cleat tape for operating the tire under normal conditions, said tread tape having a portion of tread on its exterior surface which forms part of the normal surface of the tire tread when said tread tape is mounted within the recess.

7. A convertible tire comprising a recess formed in the periphery of the tire tread, a support tape fixedly attached to the tire within the recess, a manually removable tread tape mounted within the recess and separably attached to the support tape, said tread tape having a portion of normal tire tread formed on its outwardly directed surface, and separable means for attaching the two tapes within the tire recess comprising a multiplicity of shaped threads extending from the surface of one tape and a mulitplicity of complementary shaped hooks extending from one surface of the other tape, said shaped threads being so complementary shaped that upon pressing the tape surfaces into contact with each other the threads engage the opposing threads in a manually removable relationship and are separable from each other by progressively peeling the tapes apart.

(References on following page)

References Cited by the Examiner

UNITED STATES PATENTS

| | | | |
|---|---|---|---|
| 841,155 | 1/1907 | Kelly | 152—173 |
| 1,264,500 | 4/1918 | Gildemeyer | 152—188 X |
| 1,983,238 | 12/1934 | Mucklich | 152—176 |
| 2,717,437 | 9/1955 | DeMestral | 161—65 |
| 2,808,868 | 10/1957 | Bryan | 152—228 |
| 2,953,181 | 9/1960 | Barassi | 152—176 |

ARTHUR L. LA POINT, *Primary Examiner.*

C. W. HAEFELE, *Assistant Examiner.*